US012430127B1

(12) United States Patent
Klein et al.

(10) Patent No.: US 12,430,127 B1
(45) Date of Patent: Sep. 30, 2025

(54) VECTOR TEST DECIMAL INSTRUCTION FOR VALIDITY TESTING

(71) Applicant: INTERNATIONAL BUSINESS MACHINES CORPORATION, Armonk, NY (US)

(72) Inventors: Michael Klein, Schoenaich (DE); Kerstin Claudia Schelm, Stuttgart (DE); Petra Leber, Ehningen (DE); Andreas Wagner, Wildberg (DE); Bruce Conrad Giamei, Lagrangeville, NY (US); Timothy Slegel, Staatsburg, NY (US); Jonathan D. Bradbury, Poughkeepsie, NY (US); Reid Copeland, Ontario (CA); Xin Guo, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/618,564

(22) Filed: Mar. 27, 2024

(51) Int. Cl.
*G06F 9/30* (2018.01)

(52) U.S. Cl.
CPC ...... *G06F 9/30007* (2013.01); *G06F 9/30003* (2013.01); *G06F 9/30036* (2013.01); *G06F 9/30076* (2013.01); *G06F 9/30094* (2013.01)

(58) Field of Classification Search
CPC ............. G06F 9/30007; G06F 9/30003; G06F 9/30036; G06F 9/30076; G06F 9/30094
See application file for complete search history.

(56) References Cited

U.S. PATENT DOCUMENTS

| 5,836,014 A * | 11/1998 | Faiman, Jr. ............. G06F 8/433 |
| | | 717/147 |
| 6,058,470 A * | 5/2000 | Webb ..................... G06F 9/3017 |
| | | 712/228 |
| 9,335,993 B2 * | 5/2016 | Carlough ............ G06F 9/30036 |

(Continued)

FOREIGN PATENT DOCUMENTS

JP        H06-168098 A        6/1994

OTHER PUBLICATIONS

Klein, Michael et al., "Vector Test Zoned Instruction for Validity Testing," U.S. Appl. No. 18/618,559, filed Mar. 27, 2024, 72 pages.

(Continued)

*Primary Examiner* — Corey S Faherty
(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction to perform validity testing of a source value is executed. The executing the instruction includes obtaining the source value using at least one field of the instruction and obtaining a plurality of test controls using a field of the instruction. The one or more test controls of the plurality of test controls are used to specify which digit positions of the source value are to be tested for validity and what codes are valid codes for the digit positions specified to be tested. Validity testing of at least a portion of the source value is performed based on the plurality of test controls obtained using the field of the instruction, and the performing the validity testing provides a result. The result is provided for use in further processing.

24 Claims, 7 Drawing Sheets

(56) References Cited

U.S. PATENT DOCUMENTS

| | | | |
|---|---|---|---|
| 9,710,269 | B2 | 7/2017 | Dieffenderfer et al. |
| 10,216,499 | B2 | 2/2019 | Kawahito |
| 10,346,134 | B2 | 7/2019 | Bradbury et al. |
| 10,915,385 | B2 | 2/2021 | Carlough et al. |
| 10,956,126 | B2 | 3/2021 | Hack et al. |
| 11,099,853 | B2 * | 8/2021 | Lichtenau ............ G06F 9/30145 |
| 2012/0059866 | A1 | 3/2012 | Conyngham et al. |
| 2015/0378674 | A1 | 12/2015 | Ruff |
| 2018/0095727 | A1 * | 4/2018 | Bradbury ............ G06F 9/30036 |
| 2019/0369993 | A1 * | 12/2019 | Bradbury ............ G06F 9/30167 |
| 2022/0156070 | A1 | 5/2022 | Harthcock |
| 2022/0276866 | A1 | 9/2022 | Schwarz et al. |
| 2023/0342112 | A1 | 10/2023 | Schwarz et al. |
| 2024/0303726 | A1 * | 9/2024 | Lad ..................... G06Q 20/401 |

OTHER PUBLICATIONS

List of IBM Patents or Patent Applications Treated as Related, Apr. 18, 2024, 2 pages.

IBM, "z/Architecture Principles of Operation," IBM Publication No. SA22-7832-13, Fourteenth Edition, May 2022, pp. 1-2124.

International Searching Authority, "Notification of Transmittal of the International Search Report and the Written Opinion of the International Searching Authority, or Declaration," Patent Cooperation Treaty Jun. 30, 2025, 12 pages, International Application No. PCT/EP2025/056691.

International Searching Authority, "Notification of Transmittal of the International Search Report and the Written Opinion of the International Searching Authority, or Declaration," Patent Cooperation Treaty Jun. 30, 2025, 13 pages, International Application No. PCT/EP2025/056692.

* cited by examiner

VECTOR TEST DECIMAL 500

VECTOR TEST DECIMAL INSTRUCTION FOR VALIDITY TESTING

BACKGROUND

One or more aspects relate, in general, to facilitating processing within a computing environment, and in particular, to improving processing within the computing environment.

Computer programs executing within a computing environment perform operations on data. The data may be in various data formats. Each format has one or more possible encodings, and if an encoding is not adhered to, the data is invalid. Actions taken by a computer program when invalid data is encountered varies.

To facilitate identification of invalid data at runtime, a compiler option has been provided that specifies that the validity of certain data formats is to be checked. The data is checked at runtime by selecting portions of bitstrings to be checked and comparing those portions against valid bitstrings. A message is displayed indicating the location of the invalid data so that it may be corrected.

Improvements to testing the validity of data are sought to improve processing within the computing environment.

SUMMARY

Shortcomings of the prior art are overcome, and additional advantages are provided through the provision of a computer program product for facilitating processing within a computing environment. The computer program product includes a set of one or more computer readable storage media and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. Validity testing of at least a portion of the source value is performed based on the plurality of test controls obtained using the field of the instruction. The performing the validity testing provides a result, and the result is provided for use in further processing.

By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and performing validity testing of at least a portion of the source value. The validity testing of the at least a portion of the source value is performed based on, at least, one or more test controls obtained using a field of the instruction. The one or more test controls are used to specify which digit positions of the source value are to be tested for validity and what codes are valid codes for the digit positions specified to be tested. The performing the validity testing provides a result, and the result is provided for use in further processing. By executing an instruction that performs validity testing based on one or more test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a test control of a plurality of test controls using a field of the instruction. The test control is an enhanced testing control. The enhanced testing control is checked. Based on the enhanced testing control being set to a predefined value, one or more other test controls of the plurality of test controls are to be used to perform the validity testing. Validity testing of at least a portion of the source value is performed using the one or more other test controls, based on the enhanced testing control being set to the predefined value. The performing the validity testing provides a result. The result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
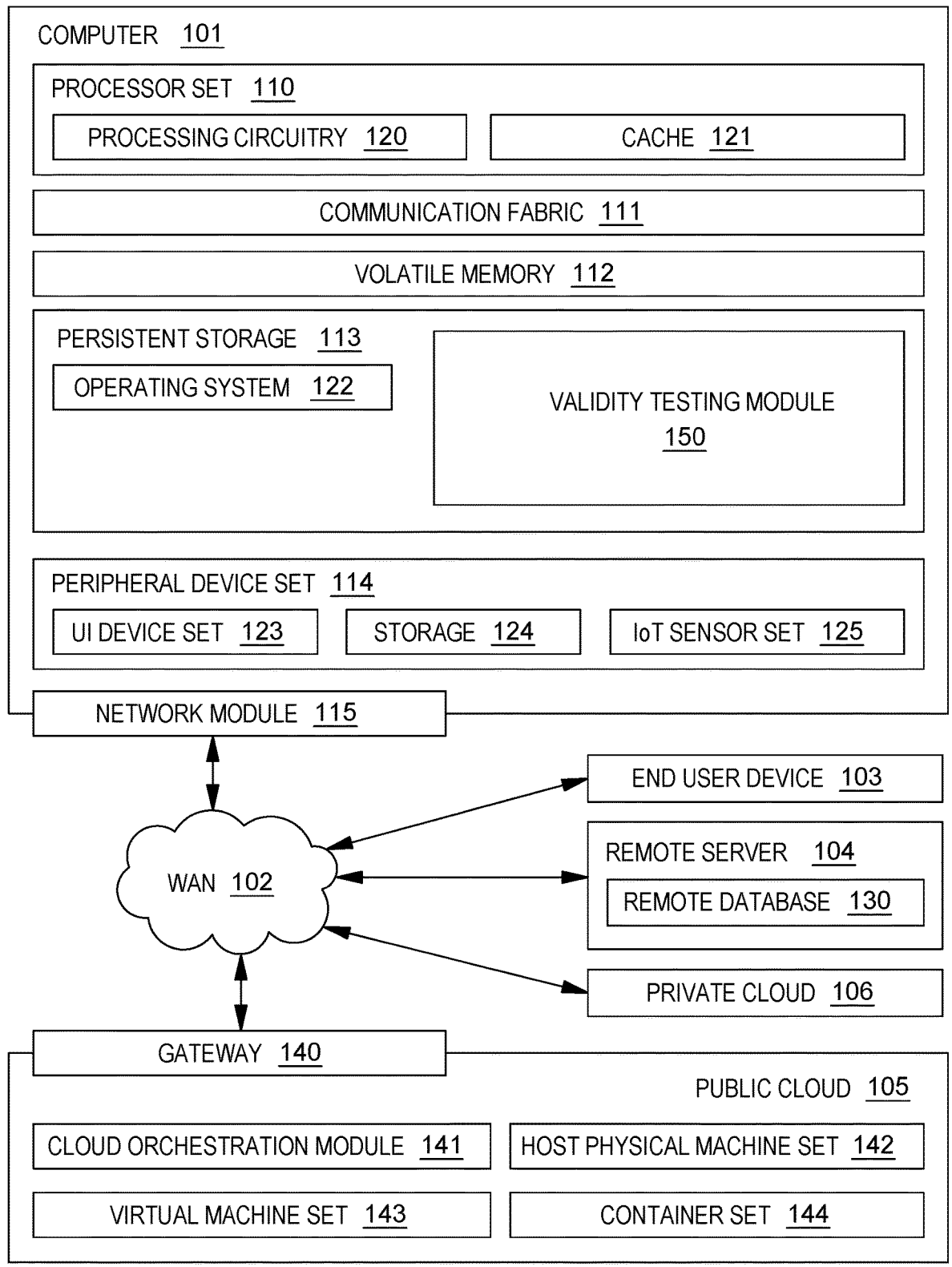
FIG. 1 depicts one example of a computing environment to incorporate and use one or more aspects of the present disclosure.

In accordance with one or more aspects of the present disclosure, a capability is provided to facilitate processing within a computing environment. In one aspect, the capability includes testing the validity of data used by one or more computer applications (also referred to as applications, computer programs, programs, etc.). The capability includes an instruction to test the data based on test controls specified by the instruction. In one example, a source value of the instruction (i.e., a source value obtained using one or more fields of the instruction) is the data to be tested. Further, the instruction specifies one or more test controls used to test validity of, for instance, at least a portion of the source value. For example, the instruction specifies one or more test controls used to test validity of, for instance, selected positions (e.g., digits and/or a sign) of the source value specified using the instruction.

In one example, the instruction is included in a computer application in one or more locations and may replace a plurality of individual checks performed within the computer application to test the validity of the data, along with one or more branches performed as part of the testing. In one or more aspects, the instruction is a single architected hardware machine instruction at the hardware/software interface. As an example, it is part of an instruction set architecture. The single instruction replaces the plurality of checks that are performed independently, and which may use multiple clock cycles. As an example, execution of the single instruction performs, in one or more instances, a plurality of validity tests in fewer clock cycles than the multiple clock cycles used by the plurality of checks. In one example, execution of the single instruction performs the plurality of validity tests in a single clock cycle (or another number of clock cycles fewer than the multiple clock cycles). Execution of the single instruction replaces the individual data validity checks (and/or additional, fewer and/or other checks) of the computer application and one or more associated branches.

In one example, a single instruction (e.g., a single architected instruction) is defined and configured to perform various test scenarios to validate selected data (e.g., selected data included in a source operand of the instruction). The various test scenarios are defined using a plurality of test controls included in one or more fields of the instruction. A test scenario of the various test scenarios is selected using one or more test controls of the plurality of test controls.

In one or more aspects, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. Validity testing of at least a portion of the source value is performed based on the plurality of test controls obtained using the field of the instruction. The performing the validity testing provides a result, and the result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

Additionally, or alternatively, in one or more embodiments, the providing the result includes including the result in a condition code returned at completion of executing the instruction. By placing the result in the condition code and returning the condition code, other portions of the computer application may check the condition code and use the result in further processing. This improves processing within the computer application.

Additionally, or alternatively, in one or more embodiments, the one or more test controls include a digits count. The digits count specifies a number of digit positions of the source value starting at a selected location to be validity tested. By using the digits count, processing is facilitated by enabling the instruction to be used to check selected scenarios.

Additionally, or alternatively, in one or more embodiments, the selected location is a rightmost digit position, such that the digits count specifies the number of rightmost digit positions of the source value to be validity tested. By using the digits count, processing is facilitated by enabling the instruction to be used to test selected digit positions providing flexibility in the validity testing.

Additionally, or alternatively, in one or more embodiments, the one or more test controls include a byte padding test. The byte padding test specifies whether a selected position within the source value is to be tested for a selected value. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process).

Additionally, or alternatively, in one or more embodiments, the selected position within the source value is a position left of a rightmost number of digits specified by a digits count of the one or more test controls to be validity tested and the selected value is zero. This enables the checking of specific positions for specific values to enhance the validity testing of the source value.

Additionally, or alternatively, in one or more embodiments, the plurality of test controls includes a sign test control, the sign test control specifying one or more valid sign codes for a sign of the source value. The inclusion of the sign test control enables the instruction to perform sign validity testing in addition to digits validity testing. This improves processing within the computer application and processor. Further, the use of a sign test control provides efficiencies in providing various cases of valid sign codes. This provides flexibility in computer application processing. For instance, certain computer programming languages enable users to choose sign codes that are valid for a particular program and the use of the sign test control enables the testing, at no extra cost, of all combinations of these settings and codes.

Additionally, or alternatively, in one or more embodiments, the plurality of test controls includes an enhanced testing control. The enhanced testing control set to a predefined value indicates that one or more other tests controls of the plurality of test controls are to be used in performing the validity testing. By providing an enhanced testing control, use of the instruction is flexible in that it may be used by current and/or future computer applications, as well as legacy computer applications. The use of the enhanced testing control allows a computer application to determine whether it would like to use other test controls of the instruction or to default to certain tests. Further, in using the single instruction for both current and legacy applications resources are saved including storage space and the use of additional operation codes.

Additionally, or alternatively, in one or more embodiments, the source value is a signed packed decimal value. The one or more other test controls include a digits count that specifies a number of selected digit positions of the signed packed decimal value to be tested, a byte padding test that for an even number of selected digit positions to be tested, specifies whether a particular digit position of the signed packed decimal value is to be tested for a selected value, and a sign test control that specifies one or more valid sign codes for a sign of the signed packed decimal value By using the instruction, various tests of a sign packed decimal value may be performed using the instruction. The instruction is a fast instruction (compared to performing various tests (e.g., compares, etc.) and branches based thereon within a computer application) that comprehensively checks the validity of the sign packed decimal value for a variety of user-defined scenarios. Further, the use of the instruction reduces the amount of code needed, and thus the amount of storage.

Additionally, or alternatively, in one or more embodiments, the number of selected digit positions of the signed packed decimal value to be tested is the number of rightmost digit positions of the source value, the particular digit position is a digit position left of the number of rightmost digits specified by the digits count and the selected value is zero. Processing is facilitated by enabling the instruction to be used to test selected digit positions providing flexibility in the validity testing.

In accordance with one or more aspects, each of the embodiments is separable and optional from one another. Further, embodiments may be combined with one another.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count. The digits count specifies a number of digit positions of the source value starting at a selected location to be validity tested. Validity testing of at least a portion of the source value is performed based on the plurality of test controls obtained using the field of the instruction. The performing the validity testing provides a result, and the result is provided for use in further processing. The providing the result includes including the result in a condition code returned at completion of executing the instruction. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied. By using the digits count, processing is facilitated by enabling the instruction to be used to check selected scenarios. By placing the result in the condition code and returning the condition code, other portions of the computer application may check the condition code and use the result in further processing. This improves processing within the computer application.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count. The digits count specifies a number of digit positions of the source value starting at a selected location to be validity tested. The selected location is a rightmost digit position, such that the digits count specifies the number of rightmost digit positions of the source value to be validity tested. Validity testing of at least a portion of the source value is performed based on the plurality of test controls obtained using the field of the instruction. The performing the validity testing provides a result, and the result is provided for use in further processing. The providing the result includes including the result in a condition code returned at completion of executing the instruction. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied. By using the digits count, processing is facilitated by enabling the instruction to be used to check selected digit positions providing flexibility in the validity checking. By placing the result in the condition code and returning the condition code, other portions of the computer application may check the condition code and use the result in further processing. This improves processing within the computer application.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count and a byte padding test. The digits count specifies a number of digit positions of the source value starting at a selected location to be validity tested and the byte padding test specifies whether a selected position within the source value is to be tested for a selected value. Validity testing of at least a portion of the source value is performed based on the plurality of test controls obtained using the field of the instruction. The performing the validity testing provides a result, and the result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied. By using the digits count, processing is facilitated by enabling the instruction to be used to check selected scenarios. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process). This improves processing within the computer application.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count and a byte padding test. The digits count specifies a number of digit positions of the source value starting at a selected location to be validity tested and the byte padding test specifies whether a selected position within the source value is to be tested for a selected value. The selected location is a rightmost digit position, such that the digits count specifies the number of rightmost digit positions of the source value to be validity tested, and the selected position within the source value is a position left of a rightmost number of digits specified by a digits count of the plurality of test controls to be validity tested and the selected value is zero. Validity testing of at least a portion of the source value is performed based on the plurality of test controls obtained using the field of the instruction. The performing the validity testing provides a result, and the result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied. By using the digits count, processing is facilitated by enabling the instruction to be used to check selected scenarios. By using the digits count, processing is facilitated by enabling the instruction to be used to check selected digit positions providing flexibility in the validity checking. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process). The checking of specific positions for specific values enhances the validity testing of the source value. This improves processing within the computer application.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count and a byte padding test and the plurality of test controls includes a sign test control. The digits count specifies a number of digit positions of the source value starting at a selected location to be validity tested, the byte padding test specifies whether a selected position within the source value is to be tested for a selected value and the sign test control specifies one or more valid sign codes for a sign of the source value. Validity testing of at least a portion of the source value is performed based on the plurality of test controls obtained using the field of the instruction. The performing the validity testing provides a result, and the result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied. By using the digits count, processing is facilitated by enabling the instruction to be used to check selected scenarios. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process). The checking of specific positions for specific values enhances the validity testing of the source value. This improves processing within the computer application. The inclusion of the sign test control enables the instruction to perform sign validity testing in addition to digits validity testing. This improves processing within the computer application and processor. Further, the use of a sign test control provides efficiencies in providing various cases of valid sign codes. This provides flexibility in computer application processing. For instance, certain computer programming languages enable users to choose sign codes that are valid for a particular program and the use of the sign test control enables the testing, at no extra cost, of all combinations of these settings and codes.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count and a byte padding test and the plurality of test controls includes a sign test control. The digits count specifies a number of digit positions of the source value starting at a selected location to be validity tested, the byte padding test specifies whether a selected position within the source value is to be tested for a selected value and the sign test control specifies one or more valid sign codes for a sign of the source value. The selected location is a rightmost digit position, such that the digits count specifies the number of rightmost digit positions of the source value to be validity tested, and the selected position within the source value is a position left of a rightmost number of digits specified by a digits count of the plurality of test controls to be validity tested and the selected value is zero. Validity testing of at least a portion of the source value is performed based on the plurality of test controls obtained using the field of the instruction. The performing the validity testing provides a result, and the result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied. By using the digits count, processing is facilitated by enabling the instruction to be used to check selected scenarios. By using the digits count, processing is facilitated by enabling the instruction to be used to check selected digit positions providing flexibility in the validity checking. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process). The checking of specific positions for specific values enhances the validity testing of the source value. This improves processing within the computer application. The inclusion of the sign test control enables the instruction to perform sign validity testing in addition to digits validity testing. This improves processing within the computer application and processor. Further, the use of a sign test control provides efficiencies in providing various cases of valid sign codes. This provides flexibility in computer application processing. For instance, certain computer programming languages enable users to choose sign codes that are valid for a particular program and the use of the sign test control enables the testing, at no extra cost, of all combinations of these settings and codes.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count and a byte padding test, and the plurality of test controls includes a sign test control and an enhanced testing control. The digits count specifies a number of digit positions of the source value starting at a selected location to be validity tested, the byte padding test specifies whether a selected position within the source value is to be tested for a selected value, the sign test control specifies one or more valid sign codes for a sign of the source value and the enhanced testing control set to a predefined value indicates that one or more other tests controls of the plurality of test controls are to be used in performing the validity testing. Validity testing of at least a portion of the source value is performed based on the plurality of test controls obtained using the field of the instruction. The performing the validity testing provides a result, and the result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly flagging incorrect data such that it is noticed and remedied. By using the digits count, processing is facilitated by enabling the instruction to be used to check selected scenarios. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process). The checking of specific positions for specific values enhances the validity testing of the source value. This improves processing within the computer application. The inclusion of the sign test control enables the instruction to perform sign validity testing in addition to digits validity testing. This improves processing within the computer application and processor. Further, the use of a sign test control provides efficiencies in providing various cases of valid sign codes. This provides flexibility in computer application processing. For instance, certain computer programming languages enable users to choose sign codes that are valid for a particular program and the use of the sign test control enables the testing, at no extra cost, of all combinations of these settings and codes. By providing an enhanced testing control, use of the instruction is flexible in that it may be used by current and/or future computer applications, as well as legacy computer applications. The use of the enhanced testing control allows a computer application to determine whether it would like to use other testing controls of the instruction or to default to certain tests. Further, in using the single instruction for both current and legacy applications resources are saved including storage space and the use of additional operation codes.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a plurality of test controls using a field of the instruction. One or more test controls of the plurality of test controls are used to specify which digit positions of the source value are to be tested for validity and what codes are valid codes for the digit positions specified to be tested. The one or more test controls include a digits count and a byte padding test, and the plurality of test controls includes a sign test control and an enhanced testing control. The digits count specifies a number of digit positions of the source value starting at a selected location to be validity tested, the byte padding test specifies whether a selected position within the source value is to be tested for a selected value, the sign test control specifies one or more valid sign codes for a sign of the source value and the enhanced testing control set to a predefined value indicates that one or more other tests controls of the plurality of test controls are to be used in performing the validity testing. The selected location is a rightmost digit position, such that the digits count specifies the number of rightmost digit positions of the source value to be validity tested, and the selected position within the source value is a position left of a rightmost number of digits specified by a digits count of the plurality of test controls to be validity tested and the selected value is zero. Validity testing of at least a portion of the source value is performed based on the plurality of test controls obtained using the field of the instruction. The performing the validity testing provides a result, and the result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied. By using the digits count, processing is facilitated by enabling the instruction to be used to check selected scenarios. By using the digits count, processing is facilitated by enabling the instruction to be used to check selected digit positions providing flexibility in the validity checking. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process). The checking of specific positions for specific values enhances the validity testing of the source value. This improves processing within the computer programming application. The inclusion of the sign test control enables the instruction to perform sign validity testing in addition to digits validity testing. This improves processing within the computer application and processor. Further, the use of a sign test control provides efficiencies in providing various cases of valid sign codes. This provides flexibility in computer application processing. For instance, certain computer programming languages enable users to choose sign codes that are valid for a particular program and the use of the sign test control enables the testing, at no extra cost, of all combinations of these settings and codes. By providing an enhanced testing control, use of the instruction is flexible in that it may be used by current and/or future computer applications, as well as legacy computer applications. The use of the enhanced testing control allows a computer application to determine whether it would like to use other testing controls of the instruction or to default to certain tests. Further, in using the single instruction for both current and legacy applications resources are saved including storage space and the use of additional operation codes.

In accordance with one or more aspects, each of the embodiments is separable and optional from one another. Further, embodiments may be combined with one another.

In one aspect, a computer system for facilitating processing within a computing environment is provided. The computer system includes at least one computing device, a set of one or more computer readable storage media, and program instructions, collectively stored in the set of one or more computer readable storage media, for causing the at least one computing device to perform the following computer operations including executing an instruction to perform validity testing of a source value. The executing the instruction includes obtaining the source value using at least one field of the instruction and obtaining a plurality of test controls using a field of the instruction. The one or more test controls of the plurality of test controls are used to specify which digit positions of the source value are to be tested for validity and what codes are valid codes for the digit positions specified to be tested. Validity testing of at least a portion of the source value is performed based on the plurality of test controls obtained using the field of the instruction, and the performing the validity testing provides a result. The result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

Additionally, or alternatively, in one or more embodiments, the providing the result includes including the result in a condition code returned at completion of executing the instruction. By placing the result in the condition code and returning the condition code, other portions of the computer application may check the condition code and use the result in further processing. This improves processing within the computer application.

Additionally, or alternatively, in one or more embodiments, the one or more test controls include a digits count. The digits count specifies a number of digit positions of the source value starting at a selected location to be validity tested. By using the digits count, processing is facilitated by enabling the instruction to be used to check various scenarios.

Additionally, or alternatively, in one or more embodiments, the one or more test controls include a byte padding test. The byte padding test specifies whether a selected position within the source value is to be tested for a selected value. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process).

Additionally, or alternatively, in one or more embodiments, the plurality of test controls includes a sign test control, the sign test control specifying one or more valid sign codes for a sign of the source value. The inclusion of the sign test control enables the instruction to perform sign validity testing in addition to digits validity testing. This improves processing within the computer application and processor. Further, the use of a sign test control provides efficiencies in providing various cases of valid sign codes. This provides flexibility in computer application processing. For instance, certain computer programming languages enable users to choose sign codes that are valid for a particular program and the use of the sign test control enables the testing, at no extra cost, of all combinations of these settings and codes.

Additionally, or alternatively, in one or more embodiments, the plurality of test controls includes an enhanced testing control. The enhanced testing control set to a predefined value indicates that one or more other tests controls of the plurality of test controls are to be used in performing the validity testing. By providing an enhanced testing control, use of the instruction is flexible in that it may be used by current and/or future computer applications, as well as legacy computer applications. The use of the enhanced testing control allows a computer application to determine whether it would like to use other testing controls of the instruction or to default to certain tests. Further, in using the single instruction for both current and legacy applications resources are saved including storage space and the use of additional operation codes.

In accordance with one or more aspects, each of the embodiments is separable and optional from one another. Further, embodiments may be combined with one another.

In one aspect, a computer-implemented method of facilitating processing within a computing environment is provided. The computer-implemented method includes executing an instruction to perform validity testing of a source value. The executing the instruction includes obtaining the source value using at least one field of the instruction and obtaining a plurality of test controls using a field of the instruction. The one or more test controls of the plurality of test controls are used to specify which digit positions of the source value are to be tested for validity and what codes are valid codes for the digit positions specified to be tested. Validity testing of at least a portion of the source value is performed based on the plurality of test controls obtained using the field of the instruction, and the performing the validity testing provides a result. The result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

Additionally, or alternatively, in one or more embodiments, the providing the result includes including the result in a condition code returned at completion of executing the instruction. By placing the result in the condition code and returning the condition code, other portions of the computer application may check the condition code and use the result in further processing. This improves processing within the computer application.

Additionally, or alternatively, in one or more embodiments, the one or more test controls include a digits count. The digits count specifies a number of digit positions of the source value starting at a selected location to be validity tested. By using the digits count, processing is facilitated by enabling the instruction to be used to check various scenarios.

Additionally, or alternatively, in one or more embodiments, the one or more test controls include a byte padding test. The byte padding test specifies whether a selected position within the source value is to be tested for a selected value. By using the byte padding test, processing is facilitated by enabling the instruction to be used to check various scenarios. The byte padding test enables, for instance, the instruction to verify if, for packed decimal variables declared by the user with, e.g., an even number of programmer declared digits, that the most significant, e.g., 4 bits of the most significant byte is in fact, e.g., zero. Previously, this required multiple instructions including a branch, which now can be rolled into one instruction in a faster way and with less code (i.e., smaller programs that require less memory to store/process).

Additionally, or alternatively, in one or more embodiments, the plurality of test controls includes a sign test control, the sign test control specifying one or more valid sign codes for a sign of the source value. The inclusion of the sign test control enables the instruction to perform sign validity testing in addition to digits validity testing. This improves processing within the computer application and processor. Further, the use of a sign test control provides efficiencies in providing various cases of valid sign codes. This provides flexibility in computer application processing. For instance, certain computer programming languages enable users to choose sign codes that are valid for a particular program and the use of the sign test control enables the testing, at no extra cost, of all combinations of these settings and codes.

Additionally, or alternatively, in one or more embodiments, the plurality of test controls includes an enhanced testing control. The enhanced testing control set to a predefined value indicates that one or more other tests controls of the plurality of test controls are to be used in performing the validity testing. By providing an enhanced testing control, use of the instruction is flexible in that it may be used by current and/or future computer applications, as well as legacy computer applications. The use of the enhanced testing control allows a computer application to determine whether it would like to use other testing controls of the instruction or to default to certain tests. Further, in using the single instruction for both current and legacy applications resources are saved including storage space and the use of additional operation codes.

Additionally, or alternatively, in one or more embodiments, the source value is a signed packed decimal value. The one or more other test controls include a digits count that specifies a number of selected digit positions of the signed packed decimal value to be tested, a byte padding test that for an even number of selected digit positions to be tested, specifies whether a particular digit position of the signed packed decimal value is to be tested for a selected value, and a sign test control that specifies one or more valid sign codes for a sign of the signed packed decimal value. By using the instruction, various tests of a sign packed decimal value may be performed using the instruction. The instruction is a fast instruction (compared to performing various tests (e.g., compares, etc.) and branches based thereon within a computer application) that comprehensively checks the validity of the sign packed decimal value for a variety of user-defined scenarios. Further, the use of the instruction reduces the amount of code needed, and thus the amount of storage.

In accordance with one or more aspects, each of the embodiments is separable and optional from one another. Further, embodiments may be combined with one another.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and performing validity testing of at least a portion of the source value. The validity testing of the at least a portion of the source value is performed based on, at least, one or more test controls obtained using a field of the instruction. The one or more test controls are used to specify which digit positions of the source value are to be tested for validity and what codes are valid codes for the digit positions specified to be tested. The performing the validity testing provides a result, and the result is provided for use in further processing. By executing an instruction that performs validity testing based on one or more test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

In accordance with one or more aspects, each of the embodiments is separable and optional from one another. Further, embodiments may be combined with one another.

In one aspect, a computer program product for facilitating processing within a computing environment is provided. The computer program product includes a set of one or more computer readable storage media, and program instructions, collectively stored in the set of one or more computer readable storage media, for causing at least one computing device to perform the following computer operations including executing an instruction to perform validity testing of a source value. The executing the instruction includes obtaining the source value using at least one field of the instruction and obtaining a test control of a plurality of test controls using a field of the instruction. The test control is an enhanced testing control. The enhanced testing control is checked. Based on the enhanced testing control being set to a predefined value, one or more other test controls of the plurality of test controls are to be used to perform the validity testing. Validity testing of at least a portion of the source value is performed using the one or more other test controls, based on the enhanced testing control being set to the predefined value. The performing the validity testing provides a result. The result is provided for use in further processing. By executing an instruction that performs validity testing based on a plurality of test controls of the instruction, improved processing within the computing environment is provided. Various tests of a source value may be specified and/or performed using the instruction. For instance, a single instruction (e.g., a single architected instruction) is used to test the source value for validity based on one or more selected scenarios of a plurality of scenarios defined using the instruction. The instruction is a fast instruction (compared to performing various tests (e.g., compares, etc.) and branches based thereon within a computer application) that comprehensively checks the validity of a source value for a variety of user-defined scenarios, as defined by the test controls. The speed of validity testing, during runtime, is increased enabling validity checking to be performed in different environments including production environments. Use in production environments avoids or minimizes significant and expensive downtime. The accuracy within computer applications is increased, and therefore, processing within a processor, by providing an efficient, flexible validity testing capability. The capability efficiently provides program correctness/robustness by explicitly and quickly flagging incorrect data such that it is noticed and remedied.

In accordance with one or more aspects, each of the embodiments is separable and optional from one another. Further, embodiments may be combined with one another.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs validity testing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as validity testing code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
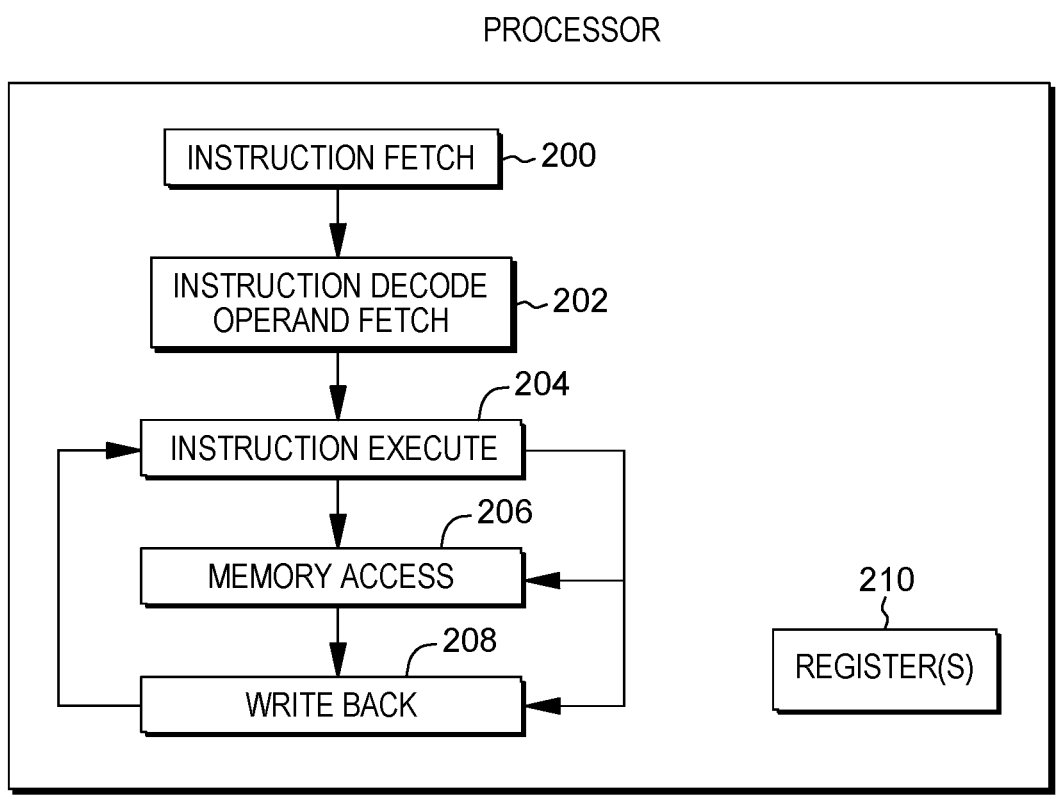
FIG. 2 depicts one example of further details of a processor of the processor set of FIG. 1, in accordance with one or more aspects of the present disclosure.

In one example, a processor (e.g., of processor set 110) includes a plurality of functional components (or a subset thereof) used to execute instructions. As depicted in FIG. 2, in one example, these functional components include, for instance, an instruction fetch component 200 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use validity testing module 150. Additionally, fewer and/or other components may be used in one or more aspects of the present disclosure.

In one example, a validity testing module (e.g., validity testing module 150) is used, in accordance with one or more aspects of the present disclosure. A validity testing module (e.g., validity testing module 150) includes code or instructions used to perform validity testing, in accordance with one or more aspects of the present disclosure. A validity testing module (e.g., validity testing module 150) includes, in one example, various sub-modules to be used to perform the processing. The sub-modules are, e.g., computer readable program code (e.g., instructions) in computer readable media, e.g., storage (persistent storage 113, cache 121, storage 124, other storage, as examples). The computer readable storage media may be part of one or more computer program products and the computer readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute one or more of the sub-modules and/or portions thereof. Many examples are possible.

Figure 3A:
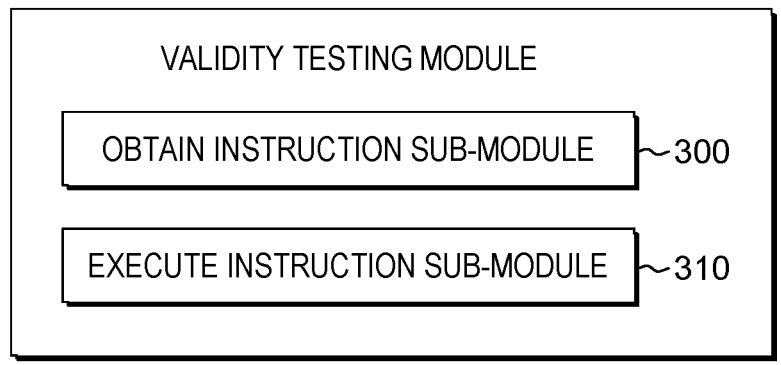
FIG. 3A depicts one example of sub-modules of a validity testing module of FIG. 1, in accordance with one or more aspects of the present disclosure.

One example of validity testing module 150 is described with reference to FIG. 3A. In one example, validity testing module 150 includes an obtain instruction sub-module 300 to obtain (e.g., receive, be provided, pull, retrieve, fetch, etc.) a validity testing instruction to be executed, and an execute instruction sub-module 310 to be used to execute the validity testing instruction.

Figure 3B:
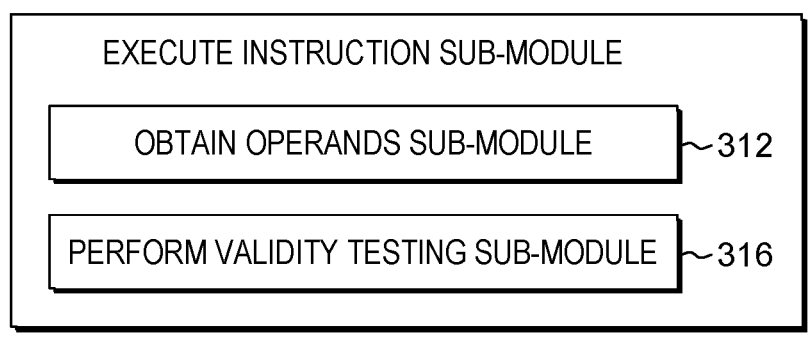
FIG. 3B depicts one example of sub-modules of the execute instruction sub-module of FIG. 3A, in accordance with one or more aspects of the present disclosure.

In one example, referring to FIG. 3B, execute instruction sub-module 310 includes, for instance, an obtain operands sub-module 312 to obtain one or more operands of the validity testing instruction; and a perform testing sub-module 316 to perform validity testing on data (e.g., a source value) obtained using the validity testing instruction based on one or more test controls specified using the validity testing instruction.

One or more of the sub-modules (e.g., sub-modules 300, 310-316) are used, in accordance with one or more aspects of the present disclosure, to perform a validity testing process on a source value (e.g., a signed packed decimal value). In one example, referring to FIG. 4, a validity testing process 400 is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the process and/or aspects thereof. Many examples are possible.

Figure 4:
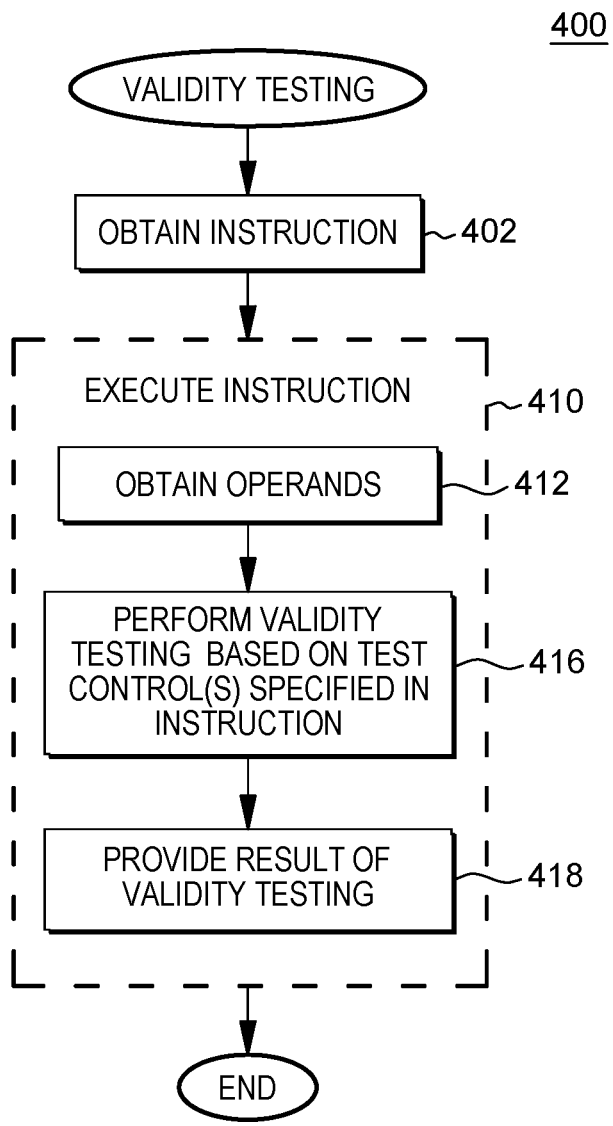
FIG. 4 depicts one example of validity testing processing, in accordance with one or more aspects of the present disclosure.

Referring to FIG. 4, in one example, validity testing process 400 (also referred to as process 400) obtains 402 (e.g., receives, retrieves, fetches, is provided, pulls, etc.) an instruction (e.g., a validity testing instruction) and executes 410 the instruction. Execution of the validity testing instruction includes, for instance, obtaining 412 one or more operands of the validity testing instruction. As examples, process 400 obtains one or more source operands that include the source value to be tested and a control operand that specifies one or more test controls to be used in testing the source value. Further, in one or more embodiments, additional, fewer and/or other operands may be obtained and/or used. The operands to be obtained depend, for instance, on which operands are specified using the instruction and/or are being used. For one or more instructions, one or more operands may be optional and may not be used in various embodiments. Many variations are possible.

Based on obtaining the operands, in one example, process 400 performs 416 validity testing (e.g., performs one or more tests) to determine the validity of the data (e.g., the source value). In one example, the one or more tests used are specified using the control operand. For example, process 400 performs validity testing of at least a portion of the source value based on one or more (e.g., a plurality of) test controls specified by a field (e.g., the control operand) of the instruction.

Based on performing the validity testing, a result from the validity testing is determined, and, in one example, process 400 provides 418 the result. For instance, the result is returned in a condition code of the instruction. The result may be used in other processing. For example, the result is returned to the computer application that issued the validity testing instruction and processing within the computer application is performed based on whether the source value (e.g., the signed packed decimal value) is valid (e.g., as determined by the validity testing, and in particular, the one or more tests selected based on the test controls). In one or more examples, the processing within the computer application may depend on whether the tested digits of the source value are valid and/or whether the sign of the source value is tested and valid. Various examples are possible.

In accordance with one or more aspects, a validity testing instruction is a vector test instruction to be used to test the validity of a source value specified by the instruction and using one or more test controls indicated by the instruction. One example of a vector test instruction is a vector test decimal instruction, one example of which is further described below. Other examples are possible.

One example of a vector test decimal instruction is described with reference to FIGS. 5A-5B. In one example, a vector test decimal instruction, such as a Vector Test Decimal instruction 500, is a single architected hardware machine instruction at the hardware/software interface. As an example, it is part of an instruction set architecture. One example of an instruction set architecture to incorporate and/or use a vector test decimal instruction and/or aspects of the present disclosure is the z/Architecture© instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

In one example, the Vector Test Decimal instruction is part of a vector facility of an instruction set architecture. The vector facility provides, for instance, fixed sized vectors ranging from, e.g., one to sixteen elements. Each vector includes data which is operated on by vector instructions defined in the facility. In one embodiment, if a vector is made up of multiple elements, then each element is processed in parallel with the other elements. Instruction completion does not occur, in one example, until processing of all the elements is complete. In other embodiments, the elements are processed partially in parallel and/or sequentially; and/or there may be additional elements.

In one embodiment, the vector instructions use vector registers that include the vectors. For instance, each vector register is, e.g., 128 bits in length and includes one to sixteen equal sized elements. If there are multiple elements in the register, the elements are indexed from left to right starting with element zero. In one example, the vector facility includes 32 vector registers, which are part of a register file. The register file is an array of processor registers in, e.g., a central processing unit (e.g., a processor of processor set 110; e.g., processor 200) that includes registers that may be used for instruction processing. In one example, the register file includes the vector registers (e.g., 32 vector registers) and other types of registers can map to a quadrant of the vector registers. For instance, sixteen floating point registers, which are 64 bits in length, can overlay the vector registers. Thus, as an example, when floating point register 2 is modified, then vector register 2 is also modified. Other mappings for other types of registers are also possible.

Vector data appears in storage in, for instance, a left-to-right sequence, similar to other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Figure 5A:
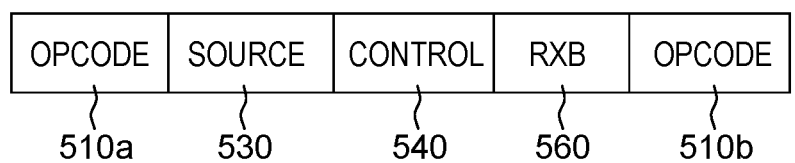
FIG. 5A depicts one example of a format of a Vector Test Decimal instruction, in accordance with one or more aspects of the present disclosure.
Figure 5B:
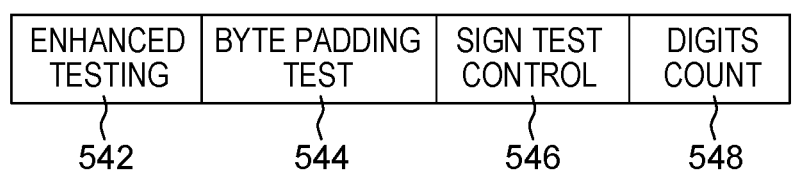
FIG. 5B depicts one example of test controls of a control field of the Vector Test Decimal instruction, in accordance with one or more aspects of the present disclosure.

Continuing with FIG. 5A, Vector Test Decimal instruction 500 includes a plurality of fields, including one or more operation code (opcode) fields 510a, 510b that indicate that this is a vector test decimal operation; a source field 530 used to designate a source location (e.g., one or more vector registers) that includes a source operand of the instruction; a control field 540 to specify one or more test controls to be used to control processing of the instruction; and a register extension bit (RXB) field 560 to be used, in one example, with the source field to designate the source location (e.g., vector register(s)) used by the instruction, as described below.

In one particular example, Vector Test Decimal instruction 500 has a format, referred to as a vector register to register operand with an extended opcode format, having, e.g., 48 bits. In this particular example, Vector Test Decimal instruction 500 has multiple operation code fields 510*a*, 510*b* (e.g., bits 0-7 and 40-47); source field 530 (also referred to as $V_1$ specifying at least one vector register) in, e.g., bits 12-15; control field 540 (also referred to as an immediate field or $I_2$) in, e.g., bits 20-35; and register extension bit (RXB) field 560 in, e.g., bits 36-39. Although in this example there are a plurality of opcode fields 510*a*, 510*b*, in other examples, there may be one opcode field. For instance, there may be one opcode field at the beginning of the instruction format. Other examples are also possible.

In one example, register extension bit (RXB) field 560 includes the most significant bit for a vector register designated operand. Bits for register designations not specified by the instruction are to be reserved and set to zero. The most significant bit is concatenated, for instance, to the left of a four-bit register designation of the vector register field (e.g., $V_1$) to create a five-bit vector register designation.

In one example, the RXB field includes four bits (e.g., bits 0-3), and the bits are defined, as follows:

0—Most significant bit for the vector register designation in, e.g., bits 8-11 of the instruction, if any.

1—Most significant bit for the vector register designation in, e.g., bits 12-15 of the instruction, if any.

2—Most significant bit for the vector register designation in, e.g., bits 16-19 of the instruction, if any.

3—Most significant bit for the vector register designation in, e.g., bits 32-35 of the instruction, if any.

Each bit is set to zero or one by, for instance, the assembler depending on the register number. For instance, for registers 0-15, the bit is set to 0; for registers 16-31, the bit is set to 1, etc. Thus, a register containing an operand is specified using, for instance, a four-bit field of the register field with the addition of its corresponding register extension bit (RXB) as the most significant bit. For instance, if the four-bit field is 0110 and the extension bit is 0, then the five bit field 00110 indicates register number 6. In a further embodiment, the RXB field includes additional bits, and more than one bit is used as an extension for each vector or location. Further, in other embodiments, the assignment of RXB bits to operands and/or bits of the instruction format may be different than the examples herein. Other variations are possible.

In one example, control field 540 includes a plurality of test controls, one or more of which are used to control validity testing of the source value. In one example, referring to FIG. 5B, control field 540 includes an enhanced testing 542 control that based on being set to one value, e.g., 0, the instruction reverts to an old version of the instruction, such that legacy code stays unaffected; a byte padding test 544 in which for an even number N, specifies whether the digit position immediately to the left of the rightmost number (N) of digits specified by a digits count (described below) is tested for the value of zero; a sign test control 546 which specifies which sign digits are considered valid; and a digits count 548 which specifies the number of, e.g., rightmost digit positions to be tested. Each of the controls is further described below:

Enhanced Testing (e.g., bit 0) 542: In one example, when the vector packed decimal enhancement facility 3 is not installed or enhanced testing 542 is, e.g., zero, the sign test control, the digits count, and the byte padding test are not used during the operation. When the vector packed decimal enhancement facility 3 is installed and enhanced testing 542 is, e.g., one, the enhanced testing specifies that one or more other test controls are to be used in performing validity testing. For instance, when enhanced testing 542 is, e.g., one, the sign test control, digits count, and byte padding test are used during the operation. Other variations are possible. In other embodiments, installation of the vector packed decimal enhancement facility 3 is not considered. Other examples are possible.

Byte Padding Test (e.g., bit 1) 544: In one example, when the vector packed decimal enhancement facility 3 is installed and the enhanced testing control is, e.g., one, byte padding test 544 specifies whether a selected position within the source value is to be tested for a selected value. For instance, byte padding test 544 specifies whether the digit position immediately to, e.g., the left of, e.g., the rightmost number (N) of digits specified by the digits count is tested for the value of, e.g., zero. The byte padding test only applies, in one example, when N is even. Examples cases are provided below. Other variations are possible. In other embodiments, installation of the vector packed decimal enhancement facility 3 is not considered. Other examples are possible.

Sign Test Control (e.g., bits 8-10) 546: In one example, when the vector packed decimal enhancement facility 3 is installed and the enhanced testing control is, e.g., one, sign test control 546 specifies one or more valid sign codes for a sign of the source value. For instance, sign test control 546 specifies which codes are considered valid sign codes, as specified in further detail below. Other variations are possible. In other embodiments, installation of the vector packed decimal enhancement facility 3 is not considered. Other examples are possible.

Digits Count (e.g., bits 11-15) 548: In one example, when the vector packed decimal enhancement facility 3 is installed and the enhanced testing control is, e.g., one, digits count 548 specifies a number of digit positions of the source value starting at a selected location to be validity tested. For instance, digits count 548 specifies the number (N) of, e.g., rightmost digit positions to be tested to contain any of the valid decimal digit codes, e.g., 0-9. Examples cases are provided below. Other variations are possible. In other embodiments, installation of the vector packed decimal enhancement facility 3 is not considered. Other examples are possible.

Reserved: In one example, bits 2-7 are reserved and should contain, e.g., zeros; otherwise, the program may not operate compatibly in the future.

During execution of the Vector Test Decimal instruction, in one example, the first operand (e.g., a source value provided in one or more vector registers specified by the source field (e.g., $V_1$)) is tested for valid decimal digits and/or a valid sign code. The test controls specified in the control field (e.g., $I_2$ field) are used to determine which codes are considered valid for each test. The result is indicated in the condition code, in one example.

In one example, the source value is in, e.g., the signed packed decimal format. In the signed packed decimal format, each byte includes, for instance, two 4-bit decimal digits (D), except for the rightmost byte, which includes a 4-bit sign (S) to the right of a 4-bit decimal digit. When a signed-packed-decimal operand resides in a vector register, the source value is 128 bits (31 digits and a sign). That is, the vector register includes one element that is 128 bits in length (which is wider than a single general purpose register and/or floating point register used to contain similarly sized decimal values found in some code, such as COBOL or PL/I code, etc.).

The test controls specified in control field 540 (e.g., $I_2$ field) are used to test selected digits and/or a sign of the source value depending on the test controls. If, for instance, the sign is to be tested, sign test control 546 specifies which codes are considered valid. Examples of sign code testing are provided below:

| Enhanced Testing | Sign Test Control (binary) | All N digits are zeros [1] | Sign codes considered valid | Sign codes considered invalid |
| --- | --- | --- | --- | --- |
| 0 | — | — | A-F | 0-9 |
| 1 | 000 | — | A-F | 0-9 |
| 1 | 001 | no or N = 0 | A-F | 0-9 |
| 1 | 001 | yes and N > 0 | A, C, E, F | 0-9, B,D |
| 1 | 010 | — | C, D | 0-B, E-F |
| 1 | 011 | no or N = 0 | C, D | 0-B, E-F |
| 1 | 011 | yes and N > 0 | C | 0-B, D-F |
| 1 | 100 | — | F | 0-E |
| 1 | 101 | — | F | 0-E |
| 1 | 110 | — | C, D, F | 0-B, E |
| 1 | 111 | no or N = 0 | C, D, F | 0-B, E |
| 1 | 111 | yes and N > 0 | C, F | 0-B, D-E |

Explanation of the Above:
— Results do not depend on this value.
[1] Invalid digits are considered to be nonzero digits.
N The number (N) of rightmost digit positions specified by the digits count control to be tested.
Other examples and variations are possible.

Further, digits of the source value to be tested and the codes that are considered valid depend, e.g., on enhanced testing 542, byte padding test 544 and/or digits count 548. Examples of digit code testing are provided below:

| Enhanced Testing | Digits Count (N) | Byte Padding Test | Meaning |
| --- | --- | --- | --- |
| 0 | — | — | Codes 0-9 are considered valid in all digit positions. |
| 1 | N = 0 | — | Codes 0-F are considered valid in all digit positions (that is, none of the digit positions are tested for validity and only the sign is tested). |
| 1 | N > 0 and odd | — | Codes 0-9 are considered valid in the rightmost N digit positions. Codes 0-F are considered valid in the remaining leftmost digit positions (that is, the remaining leftmost digit positions are not tested for validity). |
| 1 | N > 0 and even | 0 | Codes 0-9 are considered valid in the rightmost N digit positions. Codes 0-F are considered valid in the remaining leftmost digit positions (that is, the remaining leftmost digit positions are not tested for validity). |
| 1 | N > 0 and even | 1 | Codes 0-9 are considered valid in the rightmost N digit positions. Code 0 is considered valid in the digit position immediately to the left of the leftmost N digit positions. Codes 0-F are considered valid in the remaining leftmost digit positions (that is, the remaining leftmost digit positions are not tested for validity). |

Explanation of the Above:
— Results do not depend on this value.
N The number (N) of the rightmost digit positions specified by the digits count control to be tested.
Other examples and variations are possible.

Example resulting condition codes based on executing the instruction include, for instance:
0 All digit codes and the sign considered valid
1 All digit codes considered valid and sign considered invalid
2 At least one digit code considered invalid and sign considered valid
3 At least one digit code considered invalid and sign considered invalid Example program exceptions that may occur during execution of the instruction include data with DXC (data exception code) FE, vector instruction; operation (if the vector packed decimal facility for z/Architecture is not installed); transaction constraint. Additional, fewer and/or other program exceptions may occur in other embodiments and/or for other architectures.

In the description herein of a vector test decimal instruction, such as Vector Test Decimal instruction 500, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one embodiment, the fields of the instruction are separate and independent from one another; however, in other embodiments, more than one field may be combined. Further, although example types of registers are specified for the source field, other types of registers may be used. For instance, the source field, in other embodiments, may specify other than vector registers. Other examples are possible.

A vector test decimal instruction, such as Vector Test Decimal instruction 500, may have additional, fewer and/or other fields. For instance, one or more fields of a vector test decimal instruction, such as Vector Test Decimal instruction 500, may be optional. As an example, RXB field 560 is optional. For instance, a vector test decimal instruction, such as Vector Test Decimal instruction 500, may not have an RXB field. Instead, the source field includes an indication of the vector register. Many variations are possible.

Although various examples are provided for one or more formats of the instruction, additional and/or other formats may be used. Further, the processing may be used for other purposes than described herein.

One embodiment of vector test decimal processing using the vector test decimal instruction (e.g., Vector Test Decimal instruction 500) is further described with reference to FIG. 6. In one example, a vector test decimal process 600 is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

Figure 6:
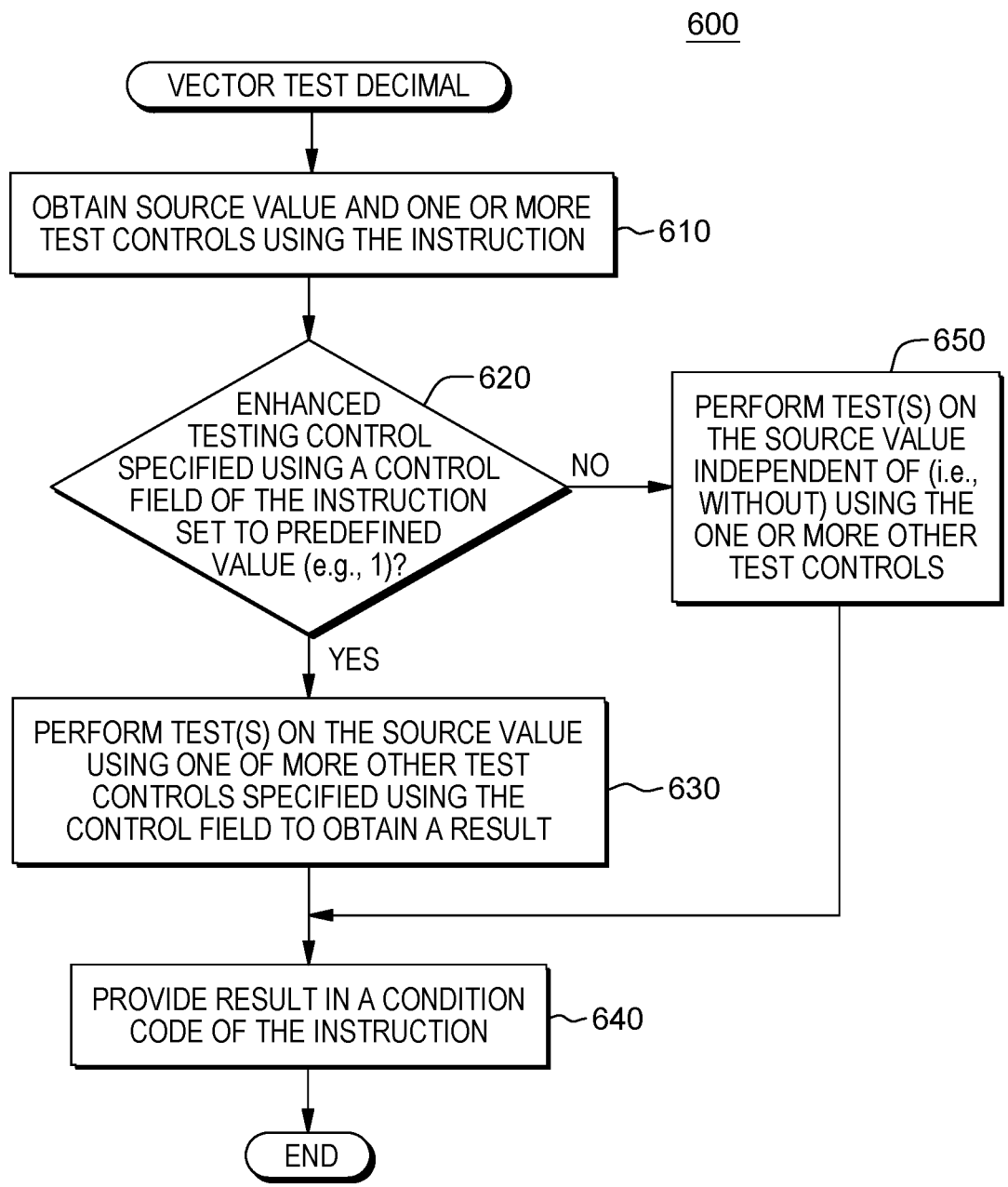
FIG. 6 depicts one example of vector test decimal instruction processing, in accordance with one or more aspects of the present disclosure.

Referring to FIG. 6, in one example, vector test decimal process 600 (also referred to as process 600) obtains 610 a source value and one or more test controls using a vector test decimal instruction (e.g., Vector Test Decimal instruction 500). In one example, the source value is obtained from one or more registers (e.g., one or more vector registers) specified using one or more fields of the instruction (e.g., source field ($V_1$) 530 and RXB field 560). Further, in one example, a plurality of test controls is obtained from control field 540 (e.g., immediate field, $I_2$) of the instruction. The plurality of test controls includes, for instance, enhanced testing 542, byte padding test 544, sign test control 546 and digits count 548.

Based on obtaining the source value and the plurality of test controls, in one embodiment, process 600 checks 620 the value of enhanced testing 542. Based on enhanced testing 542 being set to a predefined value (e.g., 1), process 600 performs 630 one or more tests on the source value (e.g., at least a portion of the source value) using one or more other test controls of the control field (e.g., $I_2$ field) of the instruction. For instance, digits count 548 is used and if the digits count is set to, e.g., 0, codes 0-F, in one example, are considered valid in all digit positions. The byte padding test (e.g., byte padding test 544) is not considered for this example. However, in another example, both the digits count and the byte padding test are used. For example, if digits count is greater than, e.g., zero and an even number and byte padding test is equal to, e.g., one, codes 0-9, as an example, are considered valid in the rightmost N digit positions, code 0 is considered valid in the digit position immediately to the left of the rightmost N digit positions, and codes 0-F are considered valid in the remaining leftmost digit positions. Additional and/or other tests may be performed, based on the test controls, as described herein. Other examples are possible.

A result of the testing is obtained, and in one example, process 600 provides 640 the result as an output of executing the instruction. In one example, the result is returned as a condition code of the instruction.

Returning to inquiry 620, based on enhanced testing 542 being set to another predefined value (e.g., 0), process 600 performs 650 one or more tests on the source value (e.g., at least a portion of the source value) independent of (i.e., without) using the one or more other test controls. For instance, process 600 tests whether the decimal digits of the source value are, e.g., 0x0 to 0x9 and whether the sign digit is, e.g., 0xA to 0xF. This testing does not take into consideration the other test controls (e.g., byte padding test 544, sign test control 546 and digits count 548). Other examples are possible.

Based on performing the one or more tests of the source value, independent of the one or more other test controls, process 600 provides 640 a result of the validity testing in, e.g., a condition code of the instruction.

Described above is an enhanced vector test decimal instruction that specifies particular test cases that may be performed, based on test controls specified by the instruction, to test the validity of a source value (e.g., a signed packed decimal value). In one or more aspects, a single architected instruction is used that enables various data correctness criteria for a signed packed decimal format to be tested at the same time (e.g., in a single clock cycle or in fewer clock cycles than previous compare/branch code sections). In another example, the source value may be an unsigned packed decimal value. Other examples are possible.

Use of the instruction improves (e.g., speeds-up) compiler (e.g., COBOL compiler) migration and currency and enables applications compiled by the compiler (e.g., COBOL applications) to adopt new architectural features, by providing a faster mechanism to enforce data validity and avoid unpredictable behavior in production.

In certain computer programming languages, such as COBOL, not all bit encodings are valid and therefore, the instruction provided herein (e.g., Vector Test Decimal instruction) is used to identify if the given data (e.g., source value, such as a signed packed decimal value (also referred to as a signed packed decimal number)) is valid. The determination of validity is based on one or more test controls provided by the instruction. This provides flexibility, robustness and effectiveness for the computer application. By using an architected instruction (e.g., a single architected instruction), testing overhead is reduced, allowing wide usage of the data validity checking, including in production environments. The architected instruction replaces long checking code previously provided within an application with just one instruction.

Previously, to help identify invalid data cases at runtime, a compiler (e.g., COBOL compiler) option has been used on packed data. This option checks data at runtime by cutting out parts of a bitstring that are to be checked, comparing them against valid bitstrings and displaying a message (that is optionally terminating) about the location(s) of invalid data so it can be fixed. This takes many instructions and branches, slowing down processing. Thus, it is typically not used in a production environment. Therefore, in accordance with one or more aspects of the present disclosure, an instruction is provided (e.g., Vector Test Decimal) that is able to selectively test different data correctness criteria at the same time (e.g., in a single clock cycle or in fewer cycles than the previous compiler option).

For instance, the compiler option may include code to perform checks, such as the code below:

```
CLC    0(3, R4), 567(R3) -> check for negative 0
JE     L0370 -> jump
TP     0(3, R4) -> check for invalid sign/digits
BRC    7, L_AbendMsg -> branch to code to produce a message
       and/or abend on invalid data
TM     0(, R4), X'F0' -> check that leftmost digit is zero (even)
BRC    7, L_AbendMsg -> branch to code to produce a message
       and/or abend on invalid data
TM     2(, R4), X'02' -> check sign code is 0xC/0xD
```

However, in accordance with one or more aspects, the above code may be replaced by, for instance:

```
VLRL   V1, 567(R3), 3 -> load 4 byte value to be tested
       into a vector register
VTP    V1, 0xC066 -> ET = 1, BPT = 1, STC = 011,
       CD = 00110 (all binary encodings)
BRC    7, L_AbendMsg -> branch to code to produce
       a message and/or abend on invalid data
```

In the replacement code sequence, a single instruction (e.g., Vector Test Decimal (VTP)) replaces multiple checks above (e.g., CLC, TP, TM, TM) and at least one branch (BRC).

In one or more aspects, the instruction (e.g., Vector Test Decimal) is placed at one or more locations in a computer application, which checks during runtime, the validity of data used in the computer application. The data to be checked is input to the instruction as a source value. The instruction performs the validity testing, as provided by the test controls of the instruction, to obtain a result. The result is provided in a condition code of the instruction. The condition code may be checked by other code of the computer application prior to performing processing using the data, e.g., one or more arithmetic computations, move to another data item, pass to another program, use in a compare operation, etc. For instance, if the condition code indicates that the data is valid, then the data is used in further processing within the computer application. Other use cases are also possible.

In one example, the condition code states whether a digit code and/or a sign code are considered valid. This is based on testing the value of a source operand with test controls (e.g., byte padding test, a sign control test, a digits count) specified in a control field of the instruction.

Other variations and embodiments are possible.

Figure 7A:
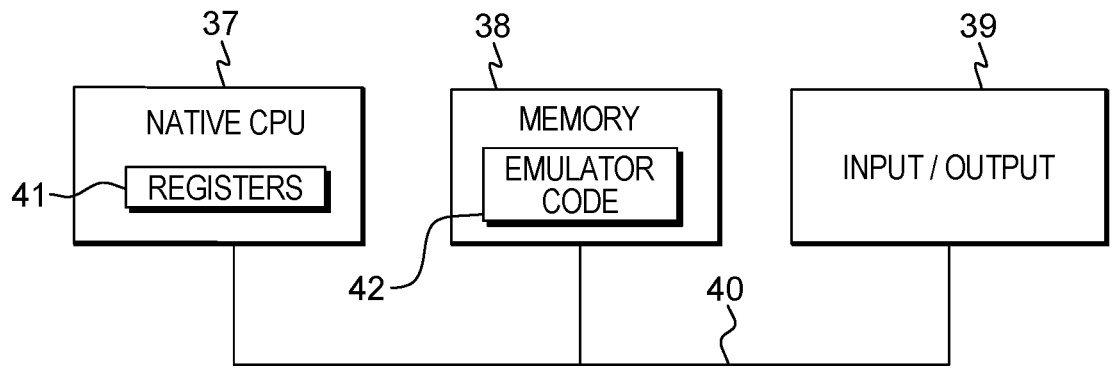
FIGS. 7A-7B depict another example of a computing environment to incorporate and use one or more aspects of the present disclosure.
Figure 7B:
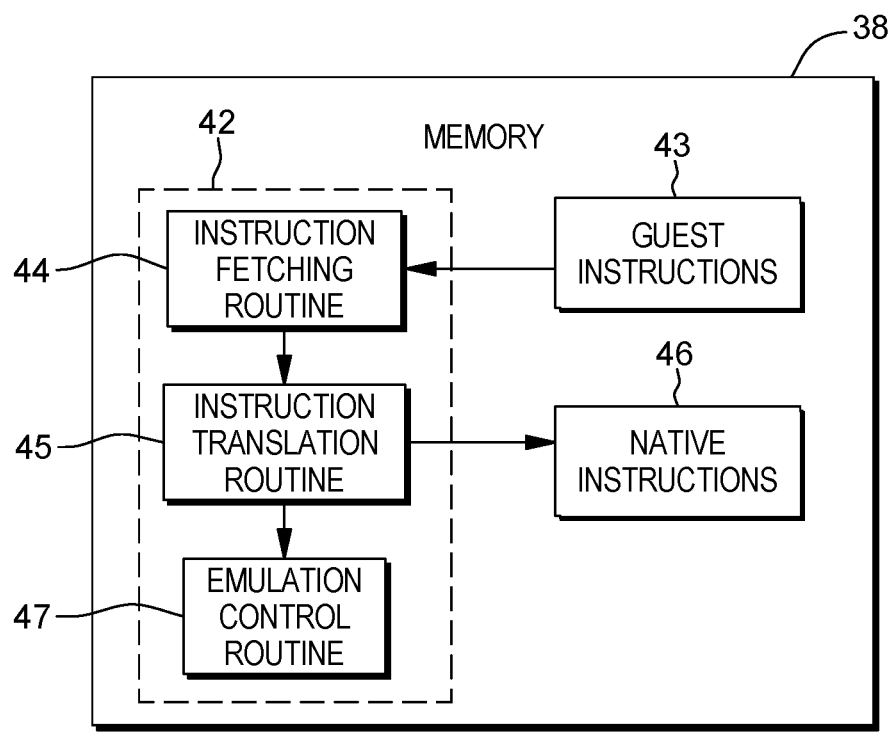

Further, although one or more examples of a computing environment to incorporate and use one or more aspects of the present disclosure are described herein, FIGS. 7A-7B depict another embodiment of a computing environment to incorporate and use one or more aspects of the present disclosure.

Referring, initially, to FIG. 7A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native CPU 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An example instruction that may be emulated is the Vector Test Decimal instruction described herein, in accordance with one or more aspects of the present disclosure.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement validity testing, vector test decimal processing and/or to perform one or more other aspects of the present disclosure.

One or more aspects of the present disclosure are tied to computer technology and facilitate processing within a computer, improving performance thereof. For instance, processing speed is increased, and error processing and latency, as well as costs, are reduced. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other instruction formats, operands and/or registers may be used. Further, other tests may be performed. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    a set of one or more computer readable storage media; and
    program instructions, collectively stored in the set of one or more computer readable storage media, for causing at least one computing device to perform the following computer operations including:
        executing an instruction to perform validity testing of a source value, the executing the instruction including:
            obtaining the source value using at least one field of the instruction;
            obtaining a plurality of test controls using a field of the instruction, wherein one or more test controls of the plurality of test controls are used to specify which digit positions of the source value are to be tested for validity and what codes are valid codes for the digit positions specified to be tested;
            performing validity testing of at least a portion of the source value based on the plurality of test controls obtained using the field of the instruction, wherein the performing the validity testing provides a result; and
            providing the result for use in further processing.

2. The computer program product of claim 1, wherein the providing the result includes including the result in a condition code returned at completion of executing the instruction.

3. The computer program product of claim 1, wherein the one or more test controls include a digits count, the digits count specifying a number of digit positions of the source value starting at a selected location to be validity tested.

4. The computer program product of claim 3, wherein the selected location is a rightmost digit position, wherein the digits count specifies the number of rightmost digit positions of the source value to be validity tested.

5. The computer program product of claim 1, wherein the one or more test controls include a byte padding test, the byte padding test specifying whether a selected position within the source value is to be tested for a selected value.

6. The computer program product of claim 5, wherein the selected position within the source value is a position left of a rightmost number of digits specified by a digits count of the one or more test controls to be validity tested and the selected value is zero.

7. The computer program product of claim 1, wherein the plurality of test controls includes a sign test control, the sign test control specifying one or more valid sign codes for a sign of the source value.

8. The computer program product of claim 1, wherein the plurality of test controls includes an enhanced testing control, the enhanced testing control set to a predefined value indicates that one or more other test controls of the plurality of test controls are to be used in performing the validity testing.

9. The computer program product of claim 8, wherein the source value is a signed packed decimal value, and wherein the one or more other test controls include a digits count that specifies a number of selected digit positions of the signed packed decimal value to be tested, a byte padding test that for an even number of selected digit positions to be tested, specifies whether a particular digit position of the signed packed decimal value is to be tested for a selected value, and a sign test control that specifies one or more valid sign codes for a sign of the signed packed decimal value.

10. The computer program product of claim 9, wherein the number of selected digit positions of the signed packed decimal value to be tested is the number of rightmost digit positions of the source value, the particular digit position is a digit position left of the number of rightmost digits specified by the digits count and the selected value is zero.

11. A computer system for facilitating processing within a computing environment, the computer system comprising:
  at least one computing device;
  a set of one or more computer readable storage media; and
  program instructions, collectively stored in the set of one or more computer readable storage media, for causing the at least one computing device to perform the following computer operations including:
    executing an instruction to perform validity testing of a source value, the executing the instruction including:
      obtaining the source value using at least one field of the instruction;
      obtaining a plurality of test controls using a field of the instruction, wherein one or more test controls of the plurality of test controls are used to specify which digit positions of the source value are to be tested for validity and what codes are valid codes for the digit positions specified to be tested;
      performing validity testing of at least a portion of the source value based on the plurality of test controls obtained using the field of the instruction, wherein the performing the validity testing provides a result; and
      providing the result for use in further processing.

12. The computer system of claim 11, wherein the providing the result include including the result in a condition code returned at completion of executing the instruction.

13. The computer system of claim 11, wherein the one or more test controls include a digits count, the digits count specifying a number of digit positions of the source value starting at a selected location to be validity tested.

14. The computer system of claim 11, wherein the one or more test controls include a byte padding test, the byte padding test specifying whether a selected position within the source value is to be tested for a selected value.

15. The computer system of claim 11, wherein the plurality of test controls includes a sign test control, the sign test control specifying one or more valid sign codes for a sign of the source value.

16. The computer system of claim 11, wherein the plurality of test controls includes an enhanced testing control, the enhanced testing control set to a predefined value indicates that one or more other test controls of the plurality of test controls are to be used in performing the validity testing.

17. A computer-implemented method of facilitating processing within a computing environment, the computer-implemented method comprising:
  executing an instruction to perform validity testing of a source value, the executing the instruction including:
    obtaining the source value using at least one field of the instruction;
    obtaining a plurality of test controls using a field of the instruction, wherein one or more test controls of the plurality of test controls are used to specify which digit positions of the source value are to be tested for validity and what codes are valid codes for the digit positions specified to be tested;
    performing validity testing of at least a portion of the source value based on the plurality of test controls obtained using the field of the instruction, wherein the performing the validity testing provides a result; and
    providing the result for use in further processing.

18. The computer-implemented method of claim 17, wherein the providing the result includes including the result in a condition code returned at completion of executing the instruction.

19. The computer-implemented method of claim 17, wherein the one or more test controls include a digits count, the digits count specifying a number of digit positions of the source value starting at a selected location to be validity tested.

20. The computer-implemented method of claim 17, wherein the one or more test controls include a byte padding test, the byte padding test specifying whether a selected position within the source value is to be tested for a selected value.

21. The computer-implemented method of claim 17, wherein the plurality of test controls includes a sign test control, the sign test control specifying one or more valid sign codes for a sign of the source value.

22. The computer-implemented method of claim 17, wherein the plurality of test controls includes an enhanced testing control, the enhanced testing control set to a predefined value indicates that one or more other test controls of the plurality of test controls are to be used in performing the validity testing.

23. The computer-implemented method of claim 22, wherein the source value is a signed packed decimal value, and wherein the one or more other test controls include a digits count that specifies a number of selected digit positions of the signed packed decimal value to be tested, a byte padding test that for an even number of selected digit positions to be tested, specifies whether a particular digit position of the signed packed decimal value is to be tested for a selected value, and a sign test control that specifies one or more valid sign codes for a sign of the signed packed decimal value.

24. A computer program product for facilitating processing within a computing environment, the computer program product comprising:
  a set of one or more computer readable storage media; and
  program instructions, collectively stored in the set of one or more computer readable storage media, for causing at least one computing device to perform the following computer operations including:
    executing an instruction to perform validity testing of a source value, the executing the instruction including:
      obtaining the source value using at least one field of the instruction;
      performing validity testing of at least a portion of the source value based on, at least, one or more test controls obtained using a field of the instruction, the one or more test controls used to specify which digit positions of the source value are to be tested for validity and what codes are valid codes for the digit positions specified to be tested, wherein the performing the validity testing provides a result; and
      providing the result for use in further processing.

* * * * *